United States Patent [19]

Jewell et al.

[11] Patent Number: 4,616,295
[45] Date of Patent: Oct. 7, 1986

[54] APPARATUS FOR MOUNTING AND ILLUMINATING LIQUID CRYSTAL DISPLAYS

[75] Inventors: Michael B. Jewell, Spokane, Wash.; Merle L. Olmstead, Sandpoint, Id.

[73] Assignee: Hewlett-Packard Company, Palo Alto, Calif.

[21] Appl. No.: 627,591

[22] Filed: Jul. 3, 1984

[51] Int. Cl.⁴ .............................................. G02F 1/133
[52] U.S. Cl. ...................................... 362/31; 350/345; 362/309
[58] Field of Search ........................ 362/812, 31, 309; 350/320, 331 R, 345; 40/556

[56] References Cited

U.S. PATENT DOCUMENTS

| | | | |
|---|---|---|---|
| 3,464,133 | 9/1969 | DePoray | 40/546 |
| 3,957,351 | 5/1976 | Stockwell | 362/812 X |
| 4,059,916 | 11/1977 | Tachihara et al. | 350/345 X |
| 4,183,628 | 1/1980 | Laesser et al. | 350/345 X |
| 4,486,077 | 12/1984 | Torresdal | 350/331 R |

FOREIGN PATENT DOCUMENTS

83/03013 9/1983 PCT Int'l Appl. ................. 350/345

Primary Examiner—Kenneth J. Ramsey
Attorney, Agent, or Firm—Leslie G. Murray

[57] ABSTRACT

A method and apparatus for mounting and illuminating a very long liquid crystal display (LCD), having minimal front-to-back thickness and providing very bright, substantially uniform, reliable illumination, is described.

3 Claims, 6 Drawing Figures

FIG 2B
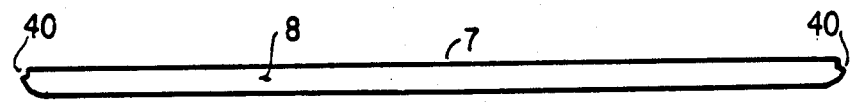
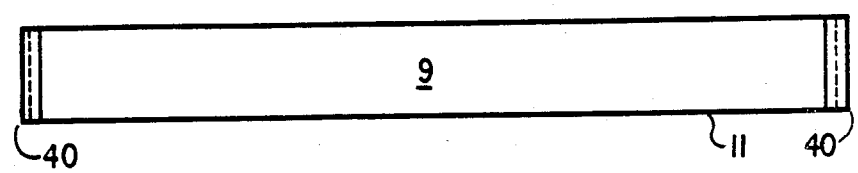
FIG 2A
FIG 3B
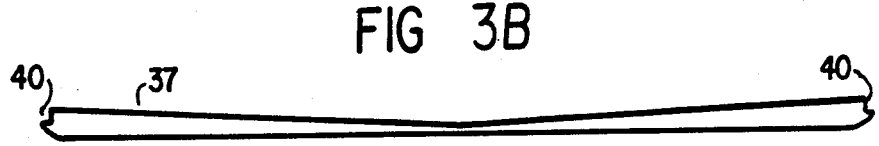
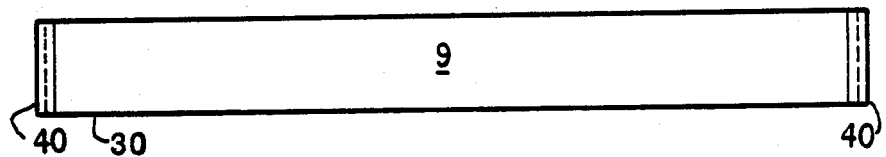
FIG 3A
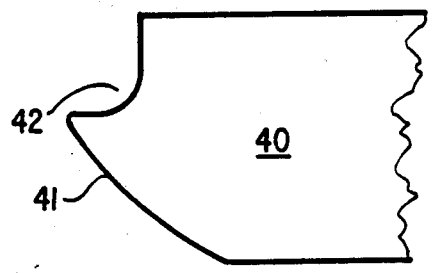
FIG 4

APPARATUS FOR MOUNTING AND ILLUMINATING LIQUID CRYSTAL DISPLAYS

BACKGROUND AND SUMMARY OF THE INVENTION

The advantages of a Liquid Crystal Display (LCD), including low driver power and convenient mechanical packaging, are well known to most designers of electronic instrumentation. However, the disadvantage of poor contrast of displayed characters relative to the ambient light in which they are to be observed is also well known.

In the past, illuminating an LCD from the front or back has actually reduced the contrast needed for improved display. Such front or back lighting is usually very non-uniform over the length and breadth of the display, particularly if the display is very long, such as, for example in a high-resolution display for electronic instrumentation such as a high frequency signal generator. In addition to reduced contrast and non-uniformity, typically the quality of such illumination varies greatly with the viewing angle of the observer, especially where being observed in a darkened room, such as a military combat information center. Since light sources for such illumination are usually specially designed and powered to their electrical limits, they are usually expensive, unreliable, and difficult and costly to service.

An LCD illuminated according to the principles of the present invention is backlighted by two incandescent, long-life light bulbs located at the ends of a primary diffuser which distributes the light from the bulbs across the exit window thereof. Substantially uniform light distribution is achieved by selectively molding roughness (hereafter also referred to as "frosting") into the back surface of the diffuser. The surface roughness is tailored to compensate for the greater absorption and internal reflection of the light toward the center of the display.

In another embodiment of the primary diffuser of the present invention, the back surface frosting is essentially uniform but the front-to-back thickness thereof is gradually reduced toward the center from each end. In this embodiment, as compensation for internal losses of light more and more light traveling parallel to the plane of the exit window is intercepted by the non-parallel back surface and reflected out the window as it approaches the center of the display.

In addition to mounting and assembly hardware, the backlighted LCD of the present invention further includes a printed circuit board (PCB) for containing LCD driver circuitry, a conductive elastomer for making connections between the PCB and the LCD, a primary reflector, secondary reflectors for reflecting light escaping from the longitudinal edges of the primary diffuser back through the exit window, and a secondary diffuser for enhancing the uniformity of diffused light emitted from the exit window of the primary diffuser.

DESCRIPTION OF THE DRAWING

FIG. 2A is a front view of the primary diffuser of the system of FIG. 1.

FIG. 2B is an edge view of the primary diffuser of FIG. 2A.

FIG. 3A is a front view of another embodiment of the diffuser of FIG. 2A.

FIG. 3B is an edge view of the diffuser of FIG. 3A.

FIG. 4 is an enlarged end view of the primary diffuser shown in FIGS. 2 and 3.

DESCRIPTION OF THE PREFERRED EMBODIMENT

Figure 1:
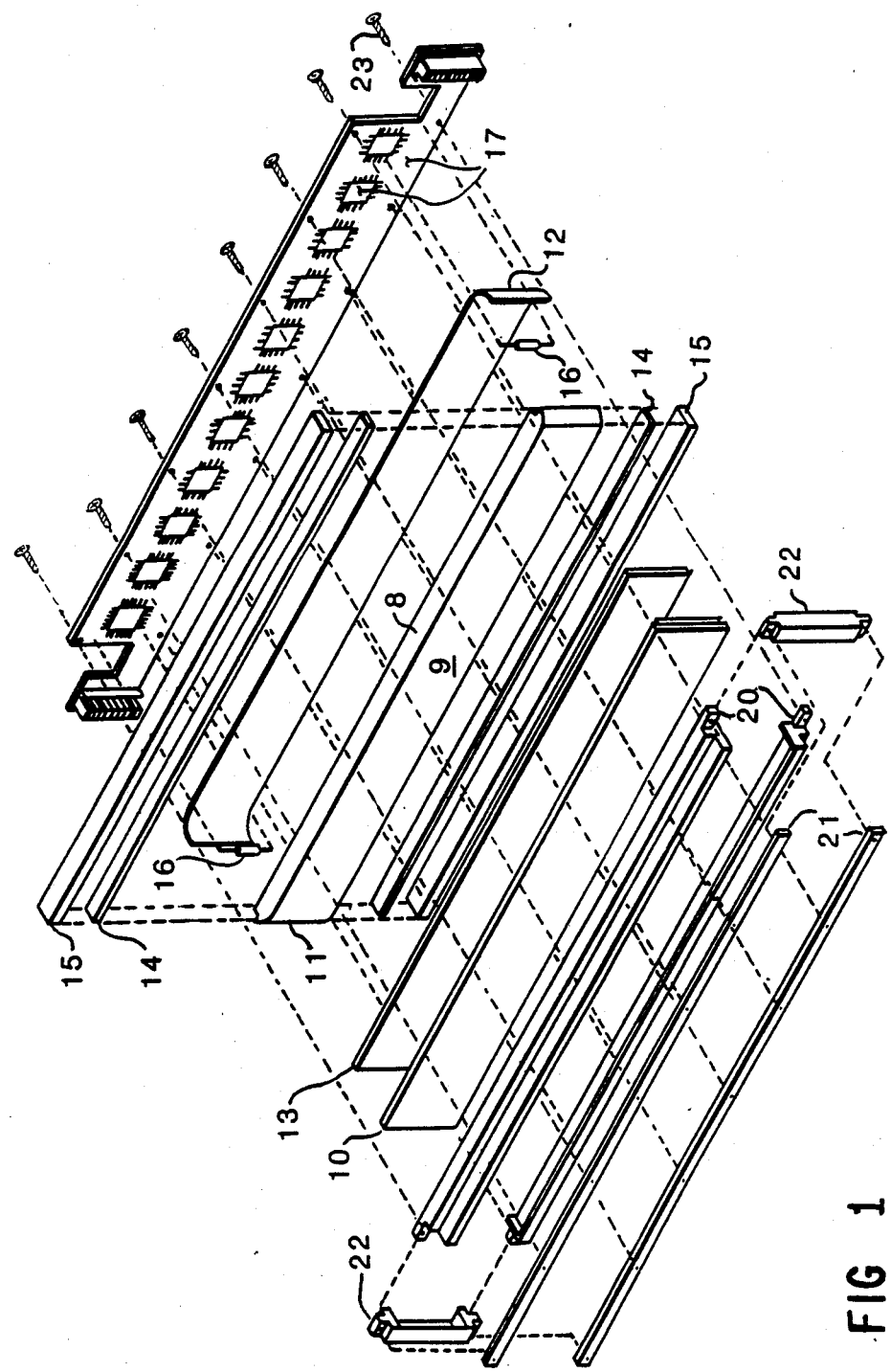
FIG. 1 is an exploded, perspective view of a system for illuminating an LCD according to the principles of the present invention.

Referring now to FIG. 1, LCD 10, a standard, wide-temperature range transmissive or transsreflective device, is backlighted by incandescent light bulbs 16 via primary diffuser 11 and secondary diffuser 13 as shown in FIG. 1. Each end 40 of diffuser 11 is constructed to form a cylindrical approximation of a parabolic reflector as shown in FIG. 4 and described elsewhere in this specification. Primary reflector 12, immediately adjacent to the back surface of diffuser 11, also wraps around the parabolically formed end portions 40 of diffuser 11 and encloses bulbs 16. Primary reflector 12 may be constructed of brilliant white paper or plastic sheet.

Referring now also to FIGS. 2A and 2B, back surface 7 of diffuser 11 is frosted by selectively molding roughness into the surface, the surface roughness being tailored to produce a gradient of coarser roughness toward the center portion of back surface 7 from each end 40. Light emitted by bulbs 16 is essentially collimated by the parabolic reflectors at each end 40 of diffuser 11. As light travels along the length of diffuser 11 from each end 40, it is eventually intercepted by frosted back surface 7 and reflected and diffused through front face 9 of diffuser 11. The gradient of fine-to-coarse surface roughness from each end 40, respectively, of back surface 7 tends to compensate for the greater absorption and internal reflection of light toward the center of diffuser 11. Thus, the intensity of light exiting window 9 at or near the center of diffuser 11 is substantially the same as the light exiting window 9 at or near each end 40.

Continuing to refer to FIG. 1, secondary reflectors 14 redirect light tending to escape through longitudinal edges 8 of diffuser 11 through window 9. These reflectors are typically constructed of the same material as primary reflector 12. Elastomer connector 15 couples LCD 10 to LCD driver circuitry on PCB 17.

Primary reflector 12 and secondary reflectors 14 are not an intregal part of diffuser 11. For total internal reflection of light, the index of refraction of the media in which the light is traveling must be greater than the index of refraction of the medium into which the light is trying to travel. The index of refraction of air is less than the clear acrylic from which diffuser 11 is constructed. In order to preserve the efficiency of internal reflection occurring at back surface 7 and along longitudinal edges 8 of diffuser 11, an acrylic-to-air interface is necessary between diffuser 11 and primary reflector 12 and secondary reflectors 14. Since any reflector which molds to the minute contours of the back surface or longitudinal edges of diffuser 11 eliminates the acrylic-to-air interface, the differential of indices of refraction necessary for total internal reflection at those surfaces is eliminated. Thus aluminizing or painting back surface 7 or edges 8 is not recommended.

Driver circuitry is mounted on the side of PCB 17 away from LCD 10, which minimizes front-to-back thickness of the display and reduces the number of interconnections to a minimum. Elastomer connector 15, comprising many parallel rows of conductive rubber separated by non-conductive rubber, connects driver circuitry to corresponding sections of LCD 10.

Secondary diffuser 13 is a thin sheet of frosted, clear or colored plastic which further diffuses light emitted from window 9, further reducing effects of more acute viewing angles. Retainers 20, stiffeners 21, and locators 22 locate and retain LCD 10, diffusers 11 and 13, and bulbs 16 while also retaining connector 15 and reflectors 12 and 14 in contact with diffuser 11.

The retainers, stiffeners and locators may be constructed of metal or plastic. Using screws 23, the entire display may be assembled separately from the instrument in which it is used for convenient warehousing and replacement in the field.

Referring now to FIG. 3A and 3B, diffuser 30 comprises another embodiment of diffuser 11, having back surface 37 tapered toward front window 9. Back surface 37 is closest to window 9 at the center of diffuser 30. In this configuration, back surface 37 is uniformly frosted since more and more light emitted from bulbs 16 is intercepted by it as light approaches the center of diffuser 30, where it is reflected and diffused through window 9.

The taper of back surface 37 is shown as a linear gradient from each end 40 to the center. However, if different, even non-uniform, light intensity through window 9 is desired, the taper of back surface 37 can be concave, convex or any combination thereof for such control.

FIG. 4 shows the detail of each end 40 of diffuser 11 and 30. Each end 40 includes reflector portion 41 and light bulb recess 42. Primary reflector 12 encloses each bulb 16 as it wraps around reflector portion 41. Reflector portion 41 is formed to approximate a cylindrical parabolic reflector for collimating light in diffusers 11 and 30.

Referring again to FIG. 1, it can be seen that the front-to-back thickness of the display of the present invention is determined primarily by the thickness dimension of diffuser 11. The present invention is most useful where the ratio of the length to thickness of diffuser 11 is greater than or equal to twenty.

We claim:

1. Apparatus for illuminating a liquid crystal display comprising a primary diffuser having two longitudinal edges, a front window surface for emitting light, end portions formed to substantially collimate light within the diffuser from light sources mounted near thereat, and a rear surface, said rear surface having a gradient of fine-to-coarse surface roughness extending from each of said end portions to the longitudinal center of said rear surface, said roughened rear surface diffusing and reflecting substantially the same intensity of light through said front window at the longitudinal center as near each of said end portions.

2. The apparatus as in claim 1 wherein said end portions are geometrically configured as parabolic reflectors for substantially collimating light within said diffuser from light sources mounted near thereat.

3. Apparatus for illuminating a liquid crystal display comprising at least one light source radiating light into a light guiding plate for distribution of the light across said liquid crystal display, the light guiding plate having on an edge an entry window for the light, said entry window being oriented toward said light source, said light guiding plate having in its plane an exit window for the light, the exit window being oriented toward the liquid crystal display for illuminating said liquid crystal display, the edge carrying said entry window being shaped substantially as a collimator to collimate the entering light, said light source is disposed such that the collimated light propagates substantially in parallel to the exit window within the light guiding plate, said light guiding plate including a rear surface disposed opposite the exit window, said rear surface having uniform surface roughness for reflecting and diffusing said collimated light, and with increasing distance from the entry window at least parts of said rear surface gradually approaches the exit window thereby providing substantially uniform illumination of the liquid crystal display.

* * * * *